United States Patent [19]

Penland

[11] 4,080,936
[45] Mar. 28, 1978

[54] ENGINE MOISTURE INDUCTION SYSTEM

[76] Inventor: Thomas K. Penland, 101 Runnels Ave., Long Beach, Mich. 39560

[21] Appl. No.: 730,735

[22] Filed: Oct. 8, 1976

[51] Int. Cl.² .......................................... F02D 19/00
[52] U.S. Cl. ............................ 123/25 A; 123/25 L; 261/18 A
[58] Field of Search ............... 123/25 R, 25 A, 25 B, 123/25 D, 25 L, 198 A, 134; 261/18 A

[56] References Cited

U.S. PATENT DOCUMENTS

| | | | |
|---|---|---|---|
| 1,418,591 | 6/1922 | McCarthy | 123/25 A |
| 2,687,711 | 8/1954 | Chambers | 123/25 R X |
| 3,044,453 | 7/1962 | Hoffman | 123/25 B |
| 3,537,434 | 11/1970 | Herpin | 123/134 |
| 3,716,040 | 2/1973 | Herpin | 123/25 R X |
| 3,749,376 | 7/1973 | Alm et al. | 123/134 X |
| 3,767,172 | 10/1973 | Mills | 123/25 R X |
| 3,875,922 | 4/1975 | Kirmiss | 123/25 R X |
| 3,965,871 | 6/1976 | Morton | 123/25 B |

Primary Examiner—Charles J. Myhre
Assistant Examiner—Ira S. Lazarus
Attorney, Agent, or Firm—Martin Fruitman

[57] ABSTRACT

A moisture feed system for the fuel-air charge used in an internal combustion engine. It includes float control of the moisturizing chamber and air dispersion to the periphery of the moisturizing chamber by a manifold built into the chamber.

7 Claims, 2 Drawing Figures

ENGINE MOISTURE INDUCTION SYSTEM

BACKGROUND OF THE INVENTION

The invention relates generally to a charge forming device for internal combustion engines and specifically to an apparatus for efficiently and precisely supplying vapor to the gasoline and air mixture fed to the cylinders of a gasoline engine.

With the advent of higher gasoline prices and the possibility of shortages of gasoline, a new interest has developed in gasoline economizing devices. One such device previously available has been the fuel-air moisturizing system. Typical patents upon such devices are U.S. Pat. Nos. 2,715,392 by Grevas; 2,378,319 by Olson, et al; and 2,811,146 by Spillman. These units were not, however, designed to be accommodated into modern automobiles. The automobile engine compartments now being produced are an example of putting the maximum number of devices into a limited space and the requirements for a fuel moisturizer to be used with present automobiles are that it be compact and relatively insensitive to tilting. The approach of simply shrinking the units of the prior art does not suffice because such a device has very much smaller liquid and vapor volumes available and the reduction in vapor volume reduces the effectiveness of the moisturizing action.

The benefits to be derived from a precisely controlled moisture induction system include not only fuel economy but also increased power, reduction in "knock", and a decarburizing action.

It is an object of the present invention to provide an effective system for mixing liquid vapors into the combustion charge of automobiles in a compact configuration which can be placed in the restricted area of present engine compartments.

It is further object of the present invention to precisely regulate the amount of liquid in the moisturizing chamber to optimize the vaporization, regardless of vehicle vibration or variations in vehicle orientation.

It is a still further object of this invention to disperse the air prior to contact with the moisturizing liquid so that optimum vaporization occurs.

It is a still further object of this invention to distribute the moisturized air in a balanced manner to the various cylinders of the engine to prevent one or more cylinders from being over or under supplied.

SUMMARY OF THE INVENTION

These and other objects may be obtained by the use of the invention described where the preferred embodiments include a balanced precision air moisturizing and distribution system. In one embodiment this system consists of a small diameter tubing entering the center of the top of the chamber and feeding a distribution manifold at the bottom of the chamber. The distribution manifold is formed of a multiplicity of small grooves cut into the bottom surface of a plate slightly smaller than, and fitting flat upon, the bottom of the chamber. This furnishes a flow of air to the bottom of the walls of the chamber, which, because of the small size of the grooves, forms a well distributed pattern of very small bubbles which rise in proximity to the chamber walls.

A toroidal shaped float is used to control the level of liquid in the chamber. The toroidal shape permits mounting the float in a centered location coaxial to the air input tube. The central location and toroidal shape make the float much less sensitive to any tilting of the chamber and prevents interference with the float function by the bubbles rising at the chamber walls.

Even greater precision is afforded the system by using two vapor outlets from the chamber in order to properly supply vapor to the bi-level manifolds used in today's automobiles. These outlets are further divided down into a total of four entries into the engine manifold. Such division assures that the moisture laden air is equally effective at all cylinders, rather than affecting only the cylinders nearest the point of entry of the air into the intake manifold.

DESCRIPTION OF THE PREFERRED EMBODIMENT

Figure 1:
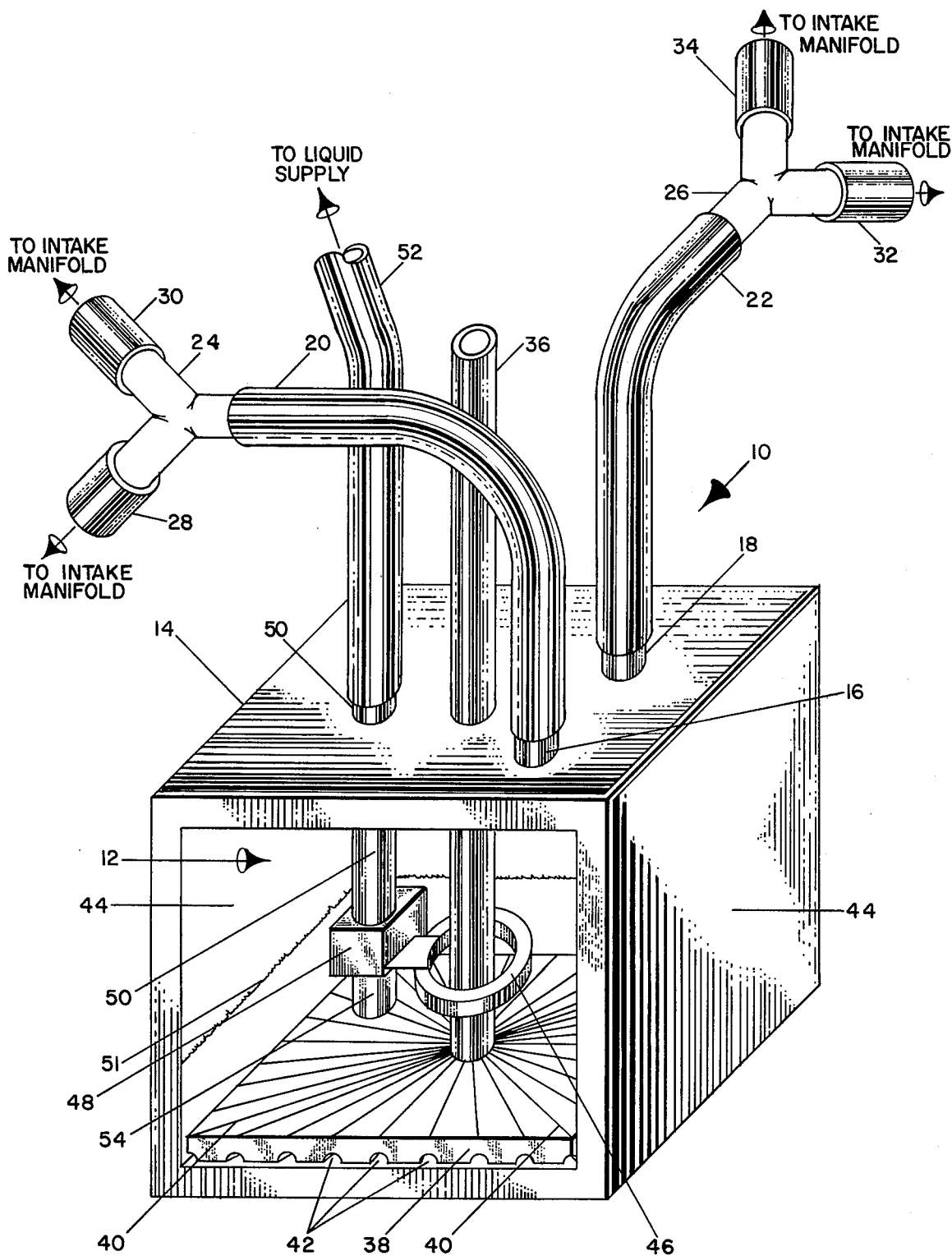
FIG. 1 is a perspective view of the preferred embodiment of the invention with the facing side of the chamber removed for viewing.

The preferred embodiment of the invention is shown in FIG. 1 where moisturizer 10 is used to load air fed to the intake manifolds of a gasoline engine with an amount of moisture sufficient to reduce gasoline consumption, but not so much as to cause the engine performance to deteriorate. The vacuum created in the engine intake manifold (not shown) is sufficient to create a flow of air from the upper portion 12 of chamber 14 through exit ports 16 and 18, tubes 20 and 22, "Y" fittings 24 and 26 and manifold tubes 28, 30, 32, and 34 to the engine manifold. This flow of air creates a vacuum in upper portion 12 of chamber 14 which draws air through air tube 36 into chamber 14.

Air tube 36 pierces the center of bottom plate 38 and is sealed into it so that air exiting air tube 36 flows to the underside of bottom plate 38 where it enters grooves 40 machined into the underside of bottom plate 38. In the preferred embodiment pictured, bottom plate 38 is manufactured from transparent plastic for ease of machining and this also results in the pattern of grooves being visible on the top side of bottom plate 38 although they are cut into the bottom side. Grooves 40 cut into plate 38 radiate out from centered air tube 36 to form a manifold to distribute the air entering through air tube 36 to the air exits 42 at the base of the vertical walls 44 of chamber 14.

The grooves in the radial pattern should be of a size and quantity such that the air bubbles formed at the base of walls 44 are small and evenly distributed around the entire periphery of bottom plate 38. In the preferred embodiment shown, there are 32 grooves, but the exact number is not critical. While the ideal distribution requires the maximum number of grooves that can practically be machined into the bottom plate, beneficial results can be attained with as few as three grooves.

The size of grooves 40 is critical in the sense that if they become too large, the air flow is such that the bubbles formed at exits 42 are too large. Large bubbles cause excessive agitation which interferes with the proper action of float 46 and can cause chamber 14 to fill completely with liquid. Even without float malfunction, large bubbles can add unvaporized liquid to the charge and cause engine malfunction. The size of grooves 40 also affects the optimization of the quantity of grooves because the total quantity of air flowing through the grooves affects the quantity of vapor eventually furnished to the engine. A small number of shallow grooves furnishes too little vapor and the benefits derived are reduced, while a large number of large grooves may cause float agitation and flooding or too much vapor in the engine to run efficiently.

The groove used in the preferred embodiment is a "V" shaped cut 1/32 inch deep and 1/32 inch across the base. This size groove is used in conjunction with a quantity of grooves between 24 and 72 in a chamber with bottom dimensions of 4 inches × 3½ inches.

Float 46 and liquid valve 48 maintain a liquid level 51 at an appropriate height so that upper vapor portion 12 of chamber 14 is large enough to permit free flow and equalization of the vapor-laden air. In the preferred embodiment the liquid level is maintained at approximately one inch depth in a chamber of 3 inch inside height. This one inch depth of liquid is sufficient to permit complete vapor-loading of the small bubbles of air as they rise through the liquid. If the liquid level becomes too high, erratic operation of the engine occurs.

If the bubbles were permitted to be larger, a greater liquid depth would be required to moisturize them, and since a sizeable vapor section is required in the chamber, a compact size chamber will not operate properly without use of multiple sources of small bubbles.

Float 46 operates valve 48 to stop the supply of liquid through liquid tube 50 and hose 52 from the liquid supply (not shown). When float 46 drops because it is no longer floating on the liquid surface which has dropped to low, valve 48 opens to permit more liquid to enter at source 54 which causes float 46 to be raised and close valve 48.

Float 46 is toroidal shaped to improve the reliability of the invention and reduce the sensitivity to tilting of the vehicle. The toroidal shape permits centering the float geometry despite the presence of air tube 36 in the center of chamber 14. The centering reduces the sensitivity of the float to tilting of chamber 14 because the geometric center of the chamber experiences only one half the change in liquid level that the sides of the chamber experience. Moreover, the center location for the float places it as remote from the bubbles rising at the sides as is possible. When the bubbles rise near the float, the agitation causes the float to bounce letting excess liquid into the chamber and because the increased liquid level causes more agitation eventually filling it with liquid to the exclusion of vapor. This causes liquid to be sucked directly into the engine and causes an engine malfunction.

Figure 2:
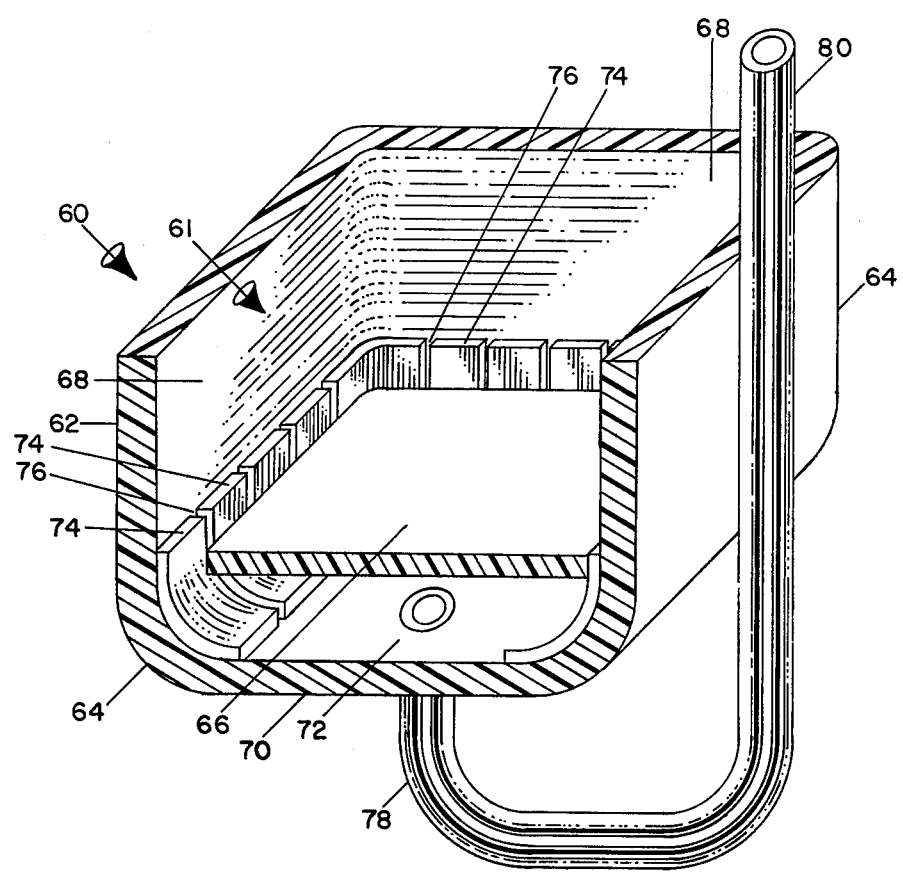
FIG. 2 is a perspective view of a cutaway bottom portion of a second embodiment of the invention showing an alternate manifold design.

FIG. 2 shows an alternate embodiment of a manifold 61 which yields the benefits of ease of assembly and adaptability to high volume production. In FIG. 2, lower portion 62 of chamber 60 is shown in a cutaway view. Approximately one half of the lower portion has been removed for ease of inspection. Chamber 60 is constructed so that bottom edges 64 are rounded both inside and out. This permits the lower edges of bottom plate 66 to rest against the walls 68 near their points of intersection with chamber bottom 70. Because of the curvature on the inside of bottom edge 64 and the dimensions of bottom plate 66, which are just slightly smaller than the inside dimensions of chamber 60 at any point above the inside curvature of bottom edge 64, bottom plate 66 will rest at a point slightly above chamber bottom 70 forming air chamber 72 adjacent to chamber bottom 70. Pads 74 are attached to walls 68 and follow the curvature of bottom edges 64 such that bottom plate 66 actually rests upon and forms an air tight seal where its lower edges touch pads 74. Pads 74 are spaced from each other by approximately 1/32 of an inch and are themselves approximately 1/32 of an inch high. Thus, controlled air leaks 76, approximately 1/32 inch square, are formed between pads 74 which permit air to bubble up only through controlled air leaks 76 and rise along side vertical walls 68 of chamber 62. The number of controlled air leaks 76 along any wall 68 is determined by the width of pads 74 along the edge of bottom plate 66. While FIG. 2, for clarity, shows pads 74 as relatively wide and only a few controlled air leaks 76, pads 74 can easily be small ribs moulded into chamber 62 and can be of dimensions approximately equal to the width of controlled air leaks 76. In such a configuration approximately sixteen air leaks would be result for every linear inch of perimeter of bottom plate 66.

FIG. 2 also shows an alternate embodiment of the means for furnishing air to manifold 61. In this embodiment air tube 78 enters chamber 60 by piercing and being sealed into chamber bottom. To prevent draining liquid from chamber 60, when the engine is not operating and creating vacuum, air tube 78 is curved upward and made long enough so that its open end 80 is above the highest liquid level anticipated.

It is to be understood that the form of the invention herein shown is merely a preferred embodiment. Various changes may be made in the size, shape and the arrangement of parts; equivalent means may be substituted for those illustrated and described; and certain features may be used independently from others without departing from the spirit and scope of the invention as defined in the following claims. For example, controlled air leaks can be formed by cutting grooves directly into the walls of the chamber and thus forming pads from the existing wall surface.

What is claimed as new and desired to be secured by Letters Patent of the United States is:

1. An apparatus for adding moisture to the charge of an internal combustion engine comprising:
    chamber means capable of holding liquids and a liquid air mixture;
    air exit means penetrating the chamber in proximity to its uppermost surface and capable of connection to an intake manifold of an internal combustion engine;
    air intake means penetrating the chamber means;
    manifold means located in close proximity to the lowest surface of the chamber means, connected to and capable of receiving air from the air intake means and distributing air only to several exit points in close proximity to the periphery of the intersection of the lowest surface of the chamber means, and the lowermost portions of the vertical walls of the chamber means;
    liquid intake means penetrating a surface of the chamber and capable of connection to an external liquid supply;
    valve means connected to and controlling flow of liquid through the liquid intake means; and
    float means, attached to and controlling the valve means, actuated by the upper surface of the liquid contained in the chamber means centered in the horizontal plane of the chamber as remote as possible from the air manifold exit points.

2. An apparatus for adding moisture to the charge of an internal combustion engine as in claim 1 wherein the manifold means comprises a bottom plate parallel with and in proximity to the bottom of the chamber means, pierced by and connected to a tubing connected to the air intake means, with grooves cut into the lower surface of said bottom plate, said grooves connecting to the open end of the tubing at the lower surface of said bottom plate.

3. An apparatus for adding moisture to the charge of an internal combustion engine as in claim 2 wherein the tubing pierces the approximate center of the bottom plate and the grooves radiate out from the open end of the tubing to the edges of the bottom plate.

4. An apparatus for adding moisture to the charge of an internal combustion engine as in claim 2 wherein the grooves are less than 1/16 of an inch deep and less than 1/16 inch across the base.

5. An apparatus for adding moisture to the charge of an internal combustion engine as in claim 2 wherein the number of grooves is less than 72 but greater than 3.

6. An apparatus for adding moisture to the charge of an internal combustion engine as in claim 1 wherein the manifold means comprises:
a bottom plate parallel with and in proximity to the bottom of the chamber means and intersecting the walls of the chamber means, so as to form an air compartment in the bottom portion of the chamber means;
sealing means in contact with both the bottom plate and the walls of the chamber means and forming an air tight seal between the bottom plate and the walls of the chamber means;
controlled leak means integral with said sealing means and spaced around the perimeter of the bottom plate by which air within the air compartment passes through said sealing means and rises along the vertical wall of the chamber means.

7. An apparatus for adding moisture to the charge of an internal combustion engine as in claim 1 wherein the air intake means penetrates the chamber means through the bottom surface of the chamber means.

* * * * *